United States Patent [19]

Shinmura et al.

[11] Patent Number: 5,724,500
[45] Date of Patent: Mar. 3, 1998

[54] MULTIPLE WRITING VOLUME BACKUP METHOD

[75] Inventors: Yoshiaki Shinmura, Chigasaki; Hiroshi Matsui, Kamakura, both of Japan

[73] Assignees: Hitachi, Ltd., Tokyo; Hitachi Software Engineering Co., Ltd., Kanagawa-ken, both of Japan

[21] Appl. No.: 442,353

[22] Filed: May 16, 1995

Related U.S. Application Data

[63] Continuation of Ser. No. 112,114, Aug. 26, 1993, abandoned.

[30] Foreign Application Priority Data

Sep. 8, 1992 [JP] Japan .................................. 4-239260

[51] Int. Cl.[6] .................................................. G06F 11/00
[52] U.S. Cl. ..................... 395/182.04; 395/182.09; 395/182.13
[58] Field of Search .................... 395/182.04, 182.13, 395/182.09; 371/10.2, 10.3; 364/268, 268.1, 268.3, 268.5, 268.8, 268.9, 269.2, 260, 260.3

[56] References Cited

U.S. PATENT DOCUMENTS

| | | | |
|---|---|---|---|
| 4,424,561 | 1/1984 | Stanley et al. | 364/200 |
| 4,809,278 | 2/1989 | Kim et al. | 371/51 |
| 4,914,575 | 4/1990 | Kiara et al. | 364/200 |
| 4,964,037 | 10/1990 | Woods et al. | 364/200 |

*Primary Examiner*—Hoa T. Nguyen
*Attorney, Agent, or Firm*—Fay, Sharpe, Beall, Fagan, Minnich & McKee

[57] ABSTRACT

The present invention relates to a method of backup sampling of multiwritten storage volumes, by which the backup sampling time is remarkably reduced by taking advantage that the same storage region exists in a plurality of volumes. Data from storage regions differing with respect to respective storage volumes is inputted concurrently and parallel, and the data is outputted to the output volumes according to the following: (a) data are output to the output volumes in the order of these storage regions; (b) data with information indicative of the order of these storage regions are output to the output volumes in the order of the storage regions upon completion of its data input; and (c) data from respective storage regions are output to different corresponding output volumes concurrently and parallel.

7 Claims, 5 Drawing Sheets

MULTIPLE WRITING VOLUME BACKUP METHOD

This is a continuation of U.S. application Ser. No. 08/112,114 filed Aug. 26, 1993, now abandoned.

BACKGROUND OF THE INVENTION

The present invention relates to a method of backing up volumes on an external storage unit of a computer system.

In backup sampling of multiwritten volumes on an external storage, it has been a typical practice to select an optimal volume from the multiwritten, volumes then to execute backup sampling thereof. Therefore, the time required for this backup sampling cannot be shortened more than the backup time required for such volumes written by a method other than the multiwriting, and depends on the total storage capacity of the whole volumes.

For example, as a method of selecting an input volume from multiwritten volumes there is a method as disclosed in Japanese Patent Publication Laid-Open Nos. 205641/1985, in which the physical volume the seek quantity of which is minimum is selected when the demand quantity for every physical volume is the same.

Further, as a method for selecting an input volume with respect to a dually-written disk unit, there are methods as disclosed in Japanese Patent Publications Laid-Open Nos. 115152/1980, 197663/1982, and 28128/1986 and so forth which pertain to a selection method for selecting one of the multiwritten volumes which has first completed read/write or seek operation.

The foregoing prior arts are all concerned with a technique of selecting out which volume is the best to be selected from the multiwritten volumes in order to achieve the best performance.

SUMMARY OF THE INVENTION

An object of the present invention is to provide a method of significantly reducing the backup processing time required to backup the multiwritten volumes in comparison with that of non multiwritten volumes. This method is implemented by taking advantage of the multiwriting feature that the same backup region exists in a plurality of the multiwritten volumes, which permits regions of respective volumes to be divided into parts then to be inputted concurrently from a plurality of volumes.

It is another object of the present invention to minimize, by limiting the number of multiwritten volumes for use in the backup, the influence of the backup processing on the other access to the multiwritten volumes.

In order to accomplish the above-mentioned objects, a method of the invention for backup-sampling the multiwritten storage volumes is characterized in that data from storage regions differing with respect to the storage volumes are input concurrently and parallel, and data are output to output volumes in the order of the storage regions.

Further, a backup method according to the invention is characterized in that data from storage regions differing with respect to the storage volumes are input concurrently and parallel, and data are output to output volumes in the order of storage regions upon completion of its data input after attaching information indicative of the order of the storage regions to the data.

Still further, a backup method according to the invention is characterized in that data from storage regions differing with respect to the storage volumes are input concurrently and parallel, and data from respective storage regions are output to corresponding respective output volumes concurrently and parallel.

Since respective data from storage regions differing with respect to multiwritten volumes can be inputted concurrently by taking advantage of the feature of the multiwritten volumes, the data input time can be shortened to a fraction of that of the multiwritten volumes. Therefore, if the writing speed of output volumes is sufficiently fast or if the degree of multiplicity of writing can be increased, the backup sampling time can be shortened significantly.

PREFERRED EMBODIMENTS OF THE INVENTION

Figure 1:
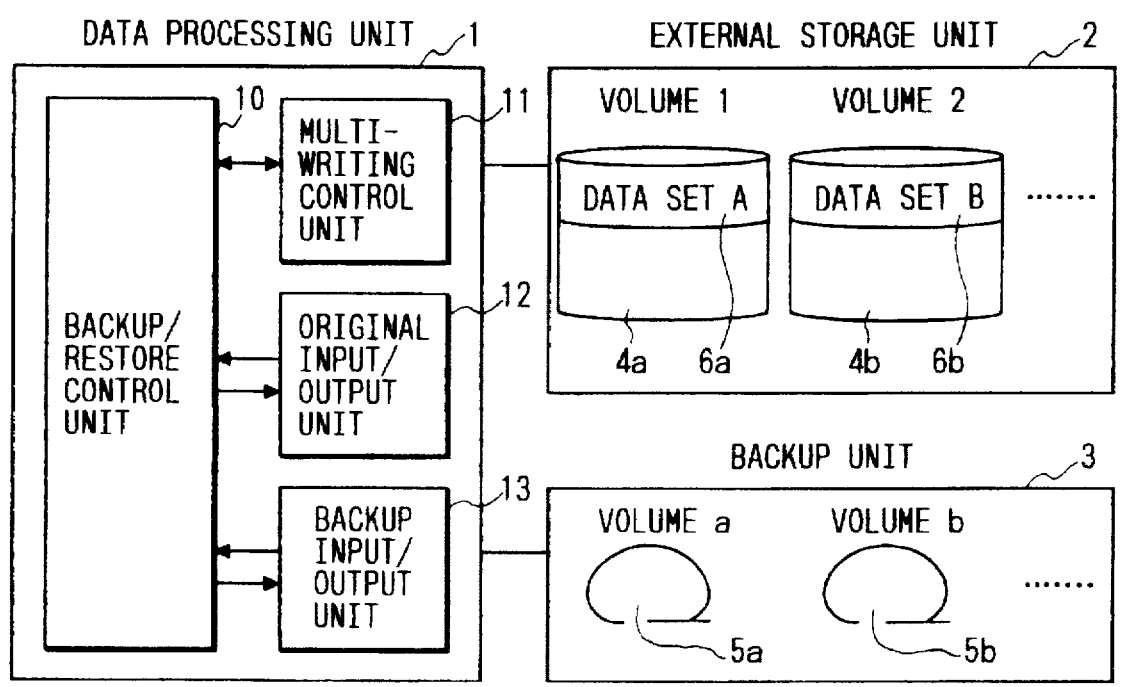
FIG. 1 is a system configuration diagram of an embodiment of the invention.

A preferred embodiment of the invention will be described in the following with reference to the accompanying drawings. FIG. 1 illustrates a system configuration of the embodiment of the invention. In FIG. 1, to a data processing unit 1 are connected an external storage 2 such as a magnetic disk unit for storing data, and a backup unit 3 such as a magnetic tape unit for making the back-up of data stored in the external storage 2, via a channel unit (not shown). The external memory 2 includes a plurality of multiply-written storage volumes, 4a, 4b . . . , in which are formed data sets 6a, 6b, . . . for storing data. The backup unit 3 likewise includes a plurality of volumes 5a, 5b, . . . The data processing unit 1 comprises a multiwriting control unit 11 which realizes multireading/multiwriting by utilizing the volumes 4a, 4b, . . . , in the external memory 2, a backup/restore control unit 10 for controlling backup/restore of the data sets 6a, 6b, . . . in the external memory 2, an original input/output unit 12 for carrying out input/output for the backup/restore, and a backup input/output processing part 13 therefor. Normally, in practice, data is read from and written in the plural volumes 4a, 4b, . . . concurrently through cooperation of the channel unit, external memory 2 and multiwriting control unit 11. The backup/restore control unit 10 enables high speed backup/restore processing of the multiwritten volumes through cooperation of the multiwriting control processing unit 11, original input/output unit 12 and backup input/output unit 13. Here, the control units 10, 11 and the input/output units 12, 13 are all realized by programs. Examples of implementation of high speed backup/restore operation are shown in FIG. 2 and later figures.

Figure 2:
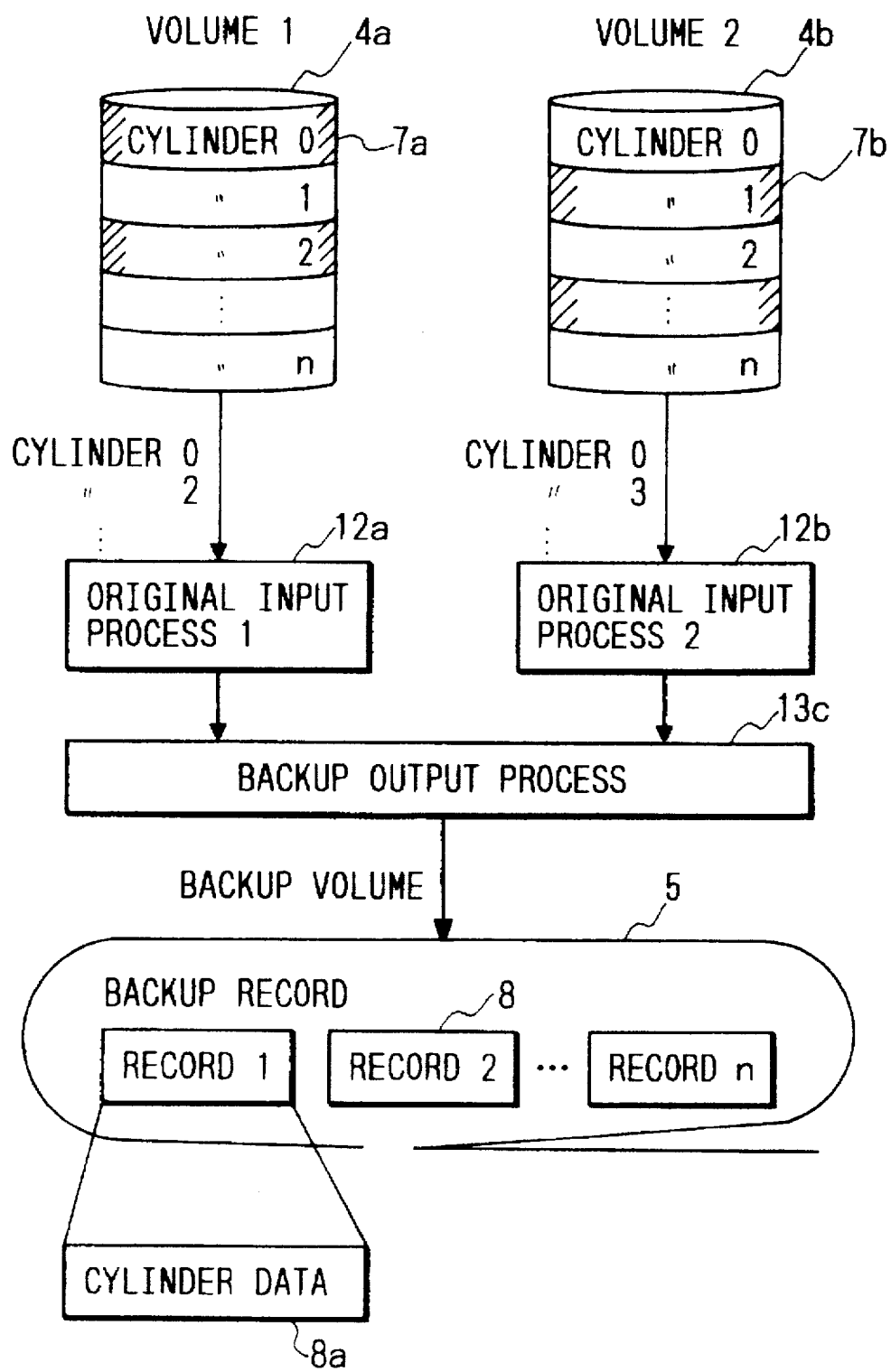
FIG. 2 is a schematic diagram illustrating a first embodiment of the invention for implementing high speed backup of dually-written volumes.
Figure 3:
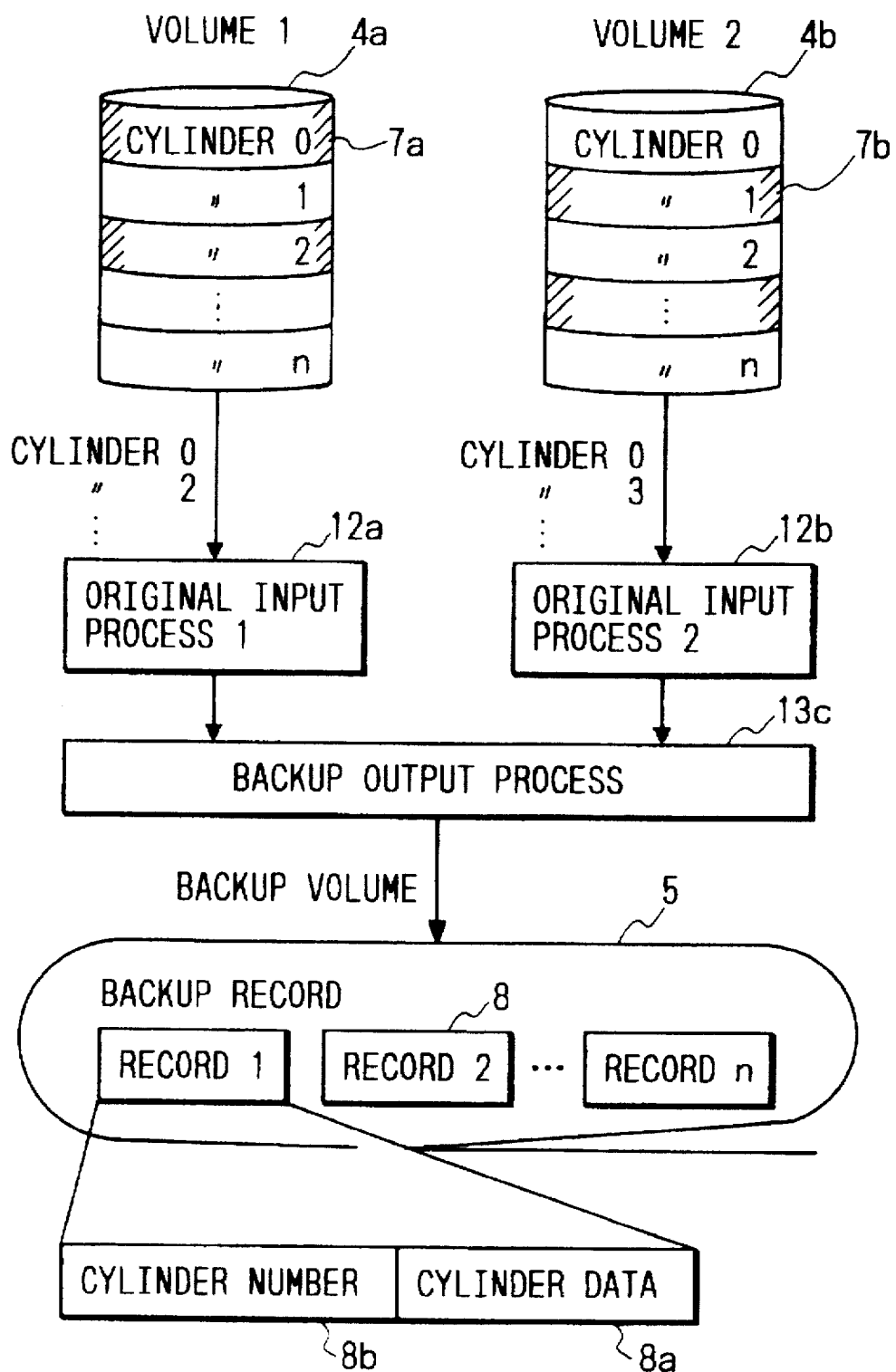
FIG. 3 is a schematic diagram illustrating a method of backing up multiwritten volumes of a second embodiment of the invention.
Figure 5:
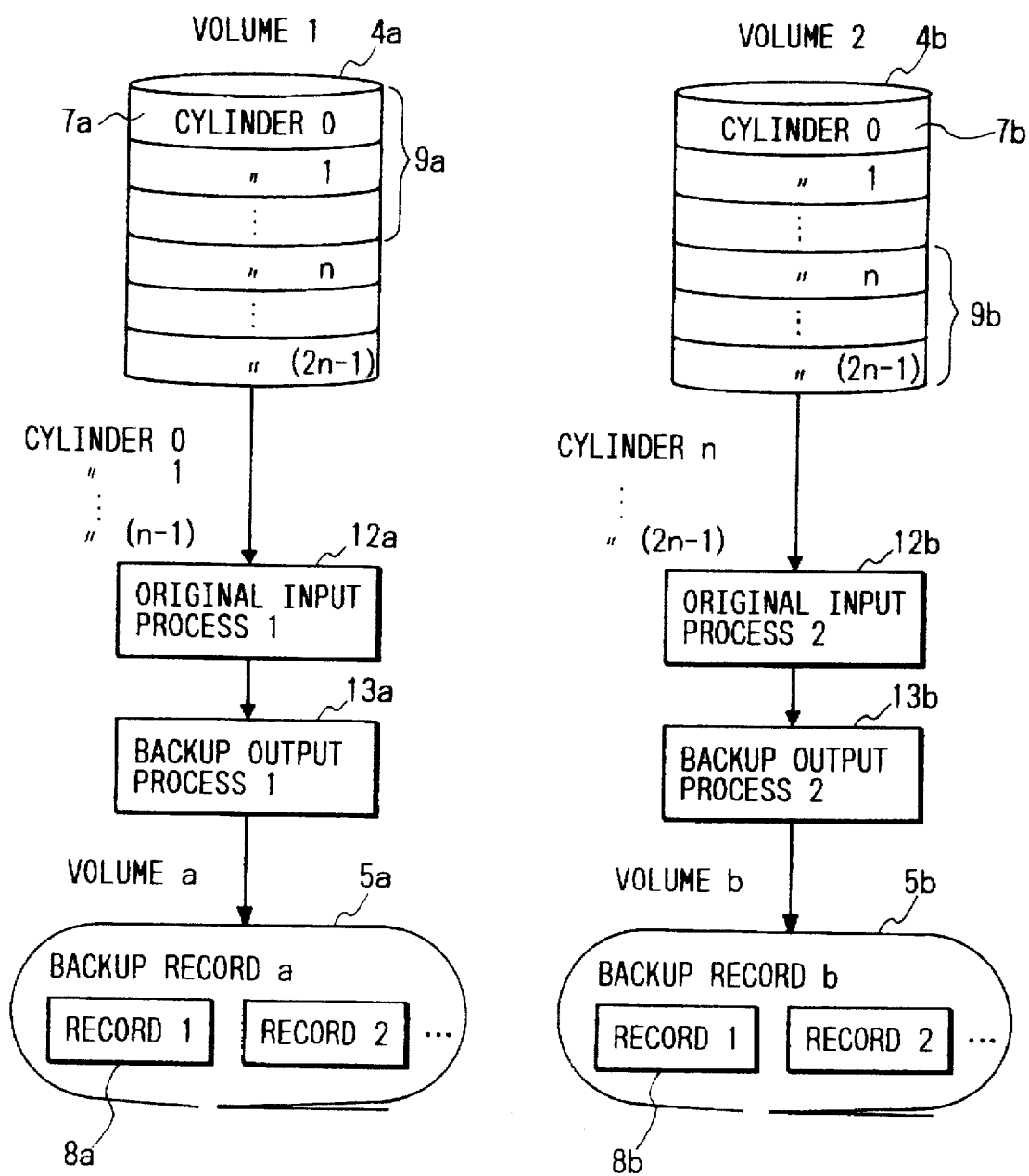
FIG. 5 is a schematic diagram illustrating a method of backing up multiwritten volumes of a fourth embodiment of the invention.

FIGS. 2, 3 and 5 show high speed backup/restore methods embodying the invention, in which dually-written volumes as multiwritten volumes.

in FIG. 2, storage regions where data is to be inputted are preset in respective volumes so as to allow concurrent input from the respective volumes, thereby to speed up backup operation. As a unit of the input region in this drawing there is shown a cylinder, however, unit may be set in a storage region of a track, a plurality of cylinders, a plurality of tracks or the like to gain the same effect. This drawing explains backup operation by way of dually-written volumes including a volume 4a and a volume 4b. The volumes 4a and 4b include plural cylinder 7a and 7b, respectively. In this arrangement, it is preset by a cooperation of the backup/restore control unit 10 and the multiwriting control unit 11 that even-numbered cylinder 7a be inputted from the volume 4a and odd-numbered cylinders 7b be inputted from the volume 4b, respectively. An original input process 12a for input from the volume and an original input process 12b for input from the volume 4b are started concurrently by the backup/restore control unit 10. The original input processes 12a, 12b each have an alternation buffer necessary to perform continuous input of data from the volumes 4a, 4b. A backup output process 13c, upon completion of data input from the cylinders 7a, 7b by respective original input process 12, 12b, outputs data to a backup volume 5 in the order of the cylinders. The backup volume 5 includes backup records 8, in each of which respective cylinder data 8a is stored. Each one of the cylinder data 8a corresponds to the amount of data of one cylinder. Since records are stored in the order of the cylinders, thus the backup format is the same as the prior art, and the restore processing is executed as conventional. Through cooperation of the channel part, external memory 2 and original input/output unit 12, input from the original volumes can be carried out for two cylinders concurrently once. Therefore, if write operation in the backup unit 3 can be done substantially at the same time of input operation thereof, and if the write operation is sufficiently fast, then the backup input can be finished theoretically in a half time of the once writing. However, if the completion of data input from respective volumes is not in the order of the cylinders, there occurs a delay due to wait. Further, needless to say, by defining a unit of plural cylinders, the input time can further be shortened.

FIG. 3 shows another embodiment of the invention where, although it is the same as in FIG. 2 that respective storage regions where data is inputted are predetermined for respective volumes so as to perform the input from respective volumes concurrently, the performance is further improved by adding information indicative of the order of the storage regions inputted into the backup records, for example, the cylinder numbers, and by outputting backup records in the order of completion of data input into the cylinders.

In the arrangement of FIG. 3, dually-written volumes including a volume 4a and a volume 4b, which are so preset that data of even-numbered cylinders 7a be inputted from the volume 4a and that of odd-numbered cylinders 7b be inputted from the volume 4b respectively through cooperation of a backup/restore control unit 10 and a multiwriting control unit 11. The original input process 12a for the input from the volume 4a and the original input process 12b for the input from the volume 4b are both started at the same time by the backup/restore control unit 10. Both the original input processes 12a and 12b each have an alternation buffer necessary to input data continuously from the volumes 4a and 4b. A backup output process 13c, upon completion of data input from cylinders 7a, 7b into the respective original input process 12a, 12b, outputs a backup record 8 with an inputted cylinder number 8b at the head of the backup record 8 to a backup volume 5. Therefore, since there is no guarantee that the backup records 8 in the backup volume 5 are outputted in the order of the cylinders, that is, the volume 5 is outputted in a form differing from the prior art backup form, when performing a backup, the backup/restore control unit 10 needs to restore the cylinder data 8a from backup, in distinction from the prior art, according to the cylinder numbers 8b attached to the backup records 8. Since the data is inputted from the original of two cylinders concurrently all at once and the data is outputted to the backup volume in the order of the completion of data input from the cylinders irrespective of the time of the completion of data input into each volume, the backup can be done theoretically in a half time of that of the once-writing backup if the write speed into the backup apparatus 3 is sufficiently fast. Needless to say, input time can be further shortened by defining a unit of plural cylinders.

Figure 4:
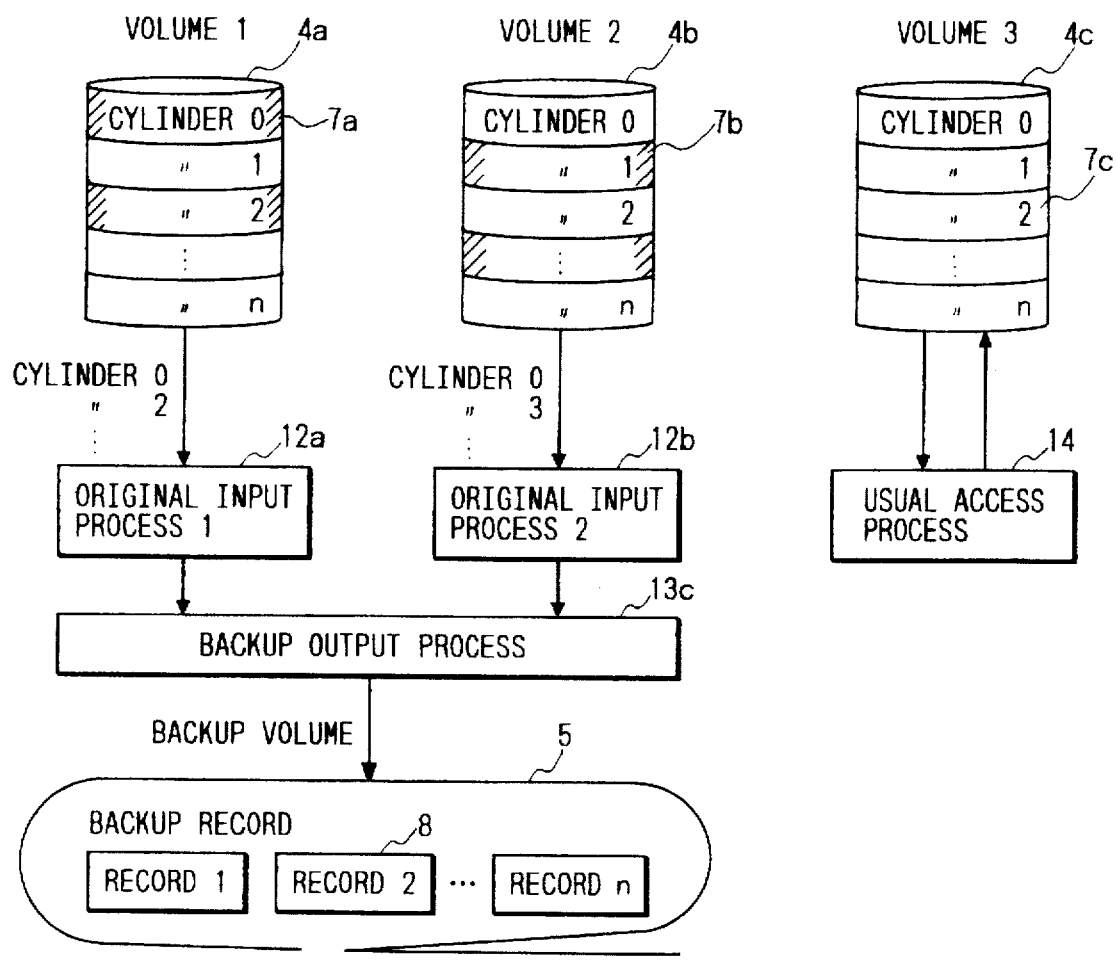
FIG. 4 is a schematic diagram illustrating a method of backing up multiwritten volumes of a third embodiment of the invention.

FIG. 4 shows another embodiment of the invention where a group of multiwritten volumes are divided into two subgroups; one exclusively for backup volumes, and the other for normal access volumes, thereby capable of minimizing the influence of the normal access during backup, that is, the access except the access for data backup.

FIG. 4 illustrates a backup process of triple-written volumes comprising volumes 4a, 4b and 4c, in which the volumes 4a and 4b are set exclusively for use as the backup volumes, and the volume 4c is set as the normal access volume through cooperation of the backup/restore control unit 10 and the multiwriting control unit 11. The usual access process 14 is controlled by the multiwriting control unit 11 so as to start always first the volume 4c. With respect to the input of the backup dedicated volumes 4a, 4b, since it is the same as in FIGS. 2 and 3, further description thereof will be omitted.

FIG. 5 illustrates still another embodiment of the invention for attaining a faster backup method where memory regions are divided according to the degree of multiplicity of multiwriting, respective backup volumes are made to correspond to the respective volumes, and thereby both backup-input and backup-output are concurrently executed. In this embodiment of the invention, the backup of a dually-written volume is performed.

When the number of cylinders in the original volume 4 backup is 2n, the backup/restore control unit 10, in cooperation with the multiwriting control unit 11 allocates cylinder 0 to n-1 (9a) to a volume 4a, and cylinders n to 2n-1 (9b) to a volume 4b. An original input process 12a input data in the cylinders 0 to n-1 (9a) of the volume 4a. At the same time, the original input process 12b input data in the cylinders n ... 2n-1 (9b) of the volume. Upon completion of respective input, backup output processes 13a, 13b output backup records 8a, 8b to backup volumes 5a, 5b which correspond to the volumes 4a, 4b, respectively. Through cooperation of the channel unit, backup unit 3 and backup input/output unit 13, output to the backup volumes 5a, 5b can be done concurrently. The original input processes 12a, 12b and the backup output processes 13a, 13b are started concurrently and operated for processing in parallel by the backup/restore control unit 10. This method is effective for solving such a problem as shown in FIG. 2 that the writing speed being not sufficiently fast is an obstruction when the backup unit 3 performs writing.

Likewise, in the case of the backup restore, the backup/restore control unit 10, in cooperation with the multiwriting control unit 11, backup input/output unit 13 and original input/output unit 12, realizes a high-speed concurrent parallel operation. As set forth hereinabove, dual-writing, for example, can theoretically halve the backup sampling time in comparison with the once-writing method.

As obvious from the foregoing description, in respect to the backup sampling of multiwritten volumes according to the invention, as significant advantage is attained that the backup time for multiwritten volumes is reduced remarkably through the steps of dividing volume regions for backup into a predetermined number of cylinders for every multiwritten volumes, inputting the predetermined number of cylinders concurrently and parallel, and outputting the inputted data via the buffer of the CPU in the order of the cylinders to respective backup records. Further, because the data is outputted to the backup volume in the order of the cylinders in the same manner as of the prior art, the restoring is not necessary.

Also, there is another advantage that the backup time for the multiwritten volumes can be further shortened through the steps of dividing the volume regions for backup into a predetermined number of cylinders for multiwritten volumes, inputting the predetermined number of cylinders concurrently and parallel, and outputting the inputted data to the backup volumes after attaching cylinder numbers to the inputted data, thereby permitting the data to be output to the backup volume in the order of cylinders upon completion of its data input. In this case, however, since outputting of the backup records is not in the order of the cylinders as in the prior art, restore processing must be done according to the cylinder numbers attached to the stored backup records.

There is still another advantage that the backup time of multiwritten volumes can be significantly reduced without affecting accesses except those of the backup by assigning a plural number of volumes out of the multiwritten volumes for dedicated backup volumes and the other volumes as normal access volumes.

Still further, there is another advantage that the backup time of multiwritten volumes can be significantly reduced through the steps of dividing the regions of the multiwritten volumes into continuous subregions according to the degree of multiplicity, setting up respective backup units corresponding to respective volumes, and executing the input of the divided continuous subregions from respective multiwritten volumes concurrently and the output to the corresponding backup apparatus.

We claim:

1. A method for producing backup data, comprising the steps of:

inputting data into a data processing unit concurrently from a plurality of storage regions, each storage region residing on a different one of a plurality of multiwritten storage volumes of an external storage unit, a first of the storage volumes having a same data content as a second of the storage volumes, and an order of the data content of the storage region on a first of the plurality of the storage volumes being the same as an order of the data content of the storage region on a second of the plurality of the storage volumes; and, outputting the data from the data processing unit to backup volumes in such a manner that the data from each of said storage regions is (i) attached with information indicative of the order of the storage region from which the input data was inputted and (ii) arranged in the backup volumes in the order it was arranged in the storage region, whereby the data contents contained in one of said storage volumes are copied to said backup volumes.

2. A backup method as set forth in claim 1, further comprising the steps of accessing at least one of said storage volumes for purposes other than backup sampling, while the backup of the other storage volumes is sampled.

3. A method for producing backup data, comprising the steps of:

inputting data, into a data processing unit, concurrently from a plurality of different addressable storage regions each of which resides on different multiwritten storage volumes of an external storage unit, wherein one of said storage volumes has the same data contents as another one of said storage volumes and the storage regions within said one storage volume have a same addressing structure as the storage regions within said another one of said storage volumes; and outputting and arranging the data from the data processing unit to backup volumes in such a manner that the input data from each of said addressable storage regions is arranged concurrently on different backup volumes, whereby the data contents contained in one of said storage volumes are copied to said backup volumes.

4. A backup method as set forth in claim 3, further comprising the steps of accessing at least one of said storage volumes for purposes other than backup sampling, and while the backup of the other storage volumes is sampled.

5. A method for producing backup data, comprising the steps of:

inputting data into a data processing unit concurrently from a plurality of storage regions, each storage region residing on a different one of a plurality of multiwritten storage volumes of an external storage unit, wherein each of the storage regions within one of said storage volumes is located in a same order relative to storage regions within another one of said storage volumes, and the data contents contained in one of said storage regions within one of said storage volumes are the same as those contained in another corresponding one of said storage regions within another one of said storage volumes and outputting and arranging the input data from the data processing unit to backup volumes in such a manner that the input data is arranged in the backup volumes according to an order of the storage regions from which the input data was inputted, whereby the data contents contained in one of said storage volumes are copied to said backup volumes.

6. A backup method as set forth in claim 5, further comprising the step of accessing at least one of said storage volumes for purposes other than for producing the backup data, while the storage volumes other than said at least one are used for producing the backup data.

7. A method for producing backup data, comprising the steps of:

inputting data, into a data processing unit concurrently from a plurality of different addressable storage regions, each of which resided on different volumes of multiwritten storage volumes of an external storage unit, wherein one of said storage volumes has data contents the same as another one of said storage volumes and has an addressing structure the same as that of said another one of said storage volumes; and outputting the input data from the data processing unit to backup volumes in such a manner that the input data from each of said addressable storage regions is (i) attached with information indicative of an address order of the original storage region from which the input data was inputted and (ii) arranged in the address order as it was in the original storage region, whereby the data contents contained in one of said storage volumes are copied to said backup volumes.

* * * * *